United States Patent [19]
Braun et al.

[11] Patent Number: 5,718,609
[45] Date of Patent: Feb. 17, 1998

[54] SHIELDED CONTACTING APPARATUS

[75] Inventors: Gerhard Braun, Erlenbach; Manfred Reichardt, Weinsberg, both of Germany

[73] Assignee: Amphenol-Tuchel Electronics GmbH, Germany

[21] Appl. No.: 662,256

[22] Filed: Jun. 14, 1996

[30] Foreign Application Priority Data

Jun. 14, 1995 [DE] Germany .................. 195 21 721.7

[51] Int. Cl.⁶ .................................................. H01R 23/70
[52] U.S. Cl. ........................ 439/630; 439/607; 235/441
[58] Field of Search ............................ 439/607, 630, 439/928.1, 188; 235/441

[56] References Cited

U.S. PATENT DOCUMENTS

| | | | |
|---|---|---|---|
| 4,575,703 | 3/1986 | Shishido | 235/479 |
| 4,752,234 | 6/1988 | Reichardt et al. | 439/260 |
| 4,799,891 | 1/1989 | Reichardt et al. | 439/43 |
| 4,814,593 | 3/1989 | Reichardt et al. | 235/482 |
| 4,900,273 | 2/1990 | Pernet | 439/630 |
| 4,932,889 | 6/1990 | Bleier et al. | 439/260 |
| 4,976,630 | 12/1990 | Schuder et al. | 439/260 |
| 5,231,274 | 7/1993 | Reynier et al. | 235/441 |
| 5,257,414 | 10/1993 | Trahan et al. | 235/441 |
| 5,269,707 | 12/1993 | Reichardt et al. | 439/630 |
| 5,320,552 | 6/1994 | Reichardt et al. | 439/331 |
| 5,334,034 | 8/1994 | Reichardt et al. | 439/188 |
| 5,334,827 | 8/1994 | Bleier et al. | 235/492 |
| 5,336,877 | 8/1994 | Raab et al. | 235/475 |
| 5,369,259 | 11/1994 | Bleier et al. | 235/441 |
| 5,550,361 | 8/1996 | Huis et al. | 235/441 |
| 5,586,890 | 12/1996 | Braun | 439/630 |
| 5,599,203 | 2/1997 | Broschard, III | 439/489 |
| 5,615,260 | 3/1997 | Kurgan | 379/433 |
| 5,640,307 | 6/1997 | Bleier et al. | 361/740 |

FOREIGN PATENT DOCUMENTS

| | | |
|---|---|---|
| 0186737 | 7/1986 | European Pat. Off. . |
| 0 333 530 A2 | 9/1989 | European Pat. Off. . |
| 36 42 424 A1 | 6/1987 | Germany . |

OTHER PUBLICATIONS

Patent Abstracts of Japan, Abstract of 60-22795, May 2, 1985.

*Primary Examiner*—Gary F. Paumen
*Attorney, Agent, or Firm*—Bacon & Thomas

[57] ABSTRACT

A contacting apparatus for a chip card, in particular for a SIM card (1), is provided, said contacting apparatus comprising a contact element support (11), a metal cover (12), reading contact elements (21) supported in said contact element support (11), switching or grounding contact elements (23, 24) supported in said contact element support (11), and means (60) for contacting and connecting the metal cover (12) via said switching contact elements to ground.

26 Claims, 3 Drawing Sheets

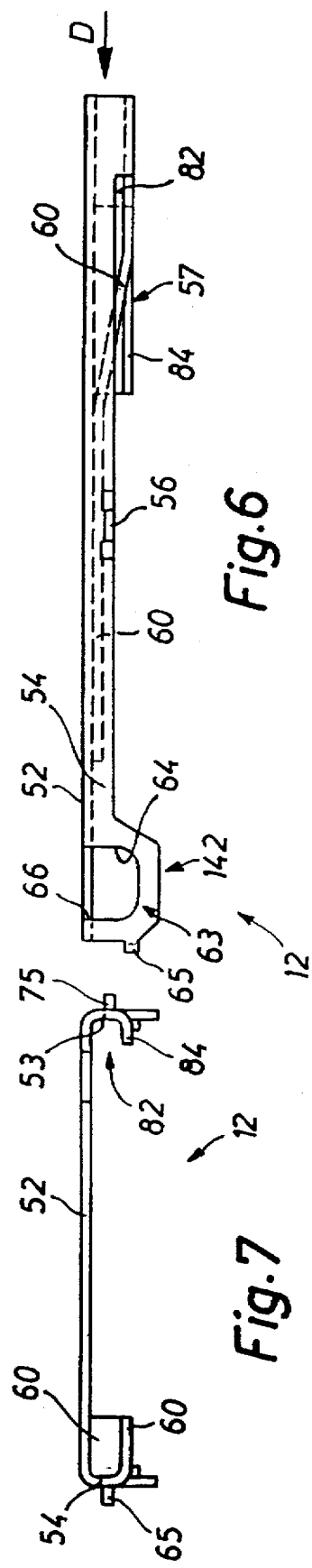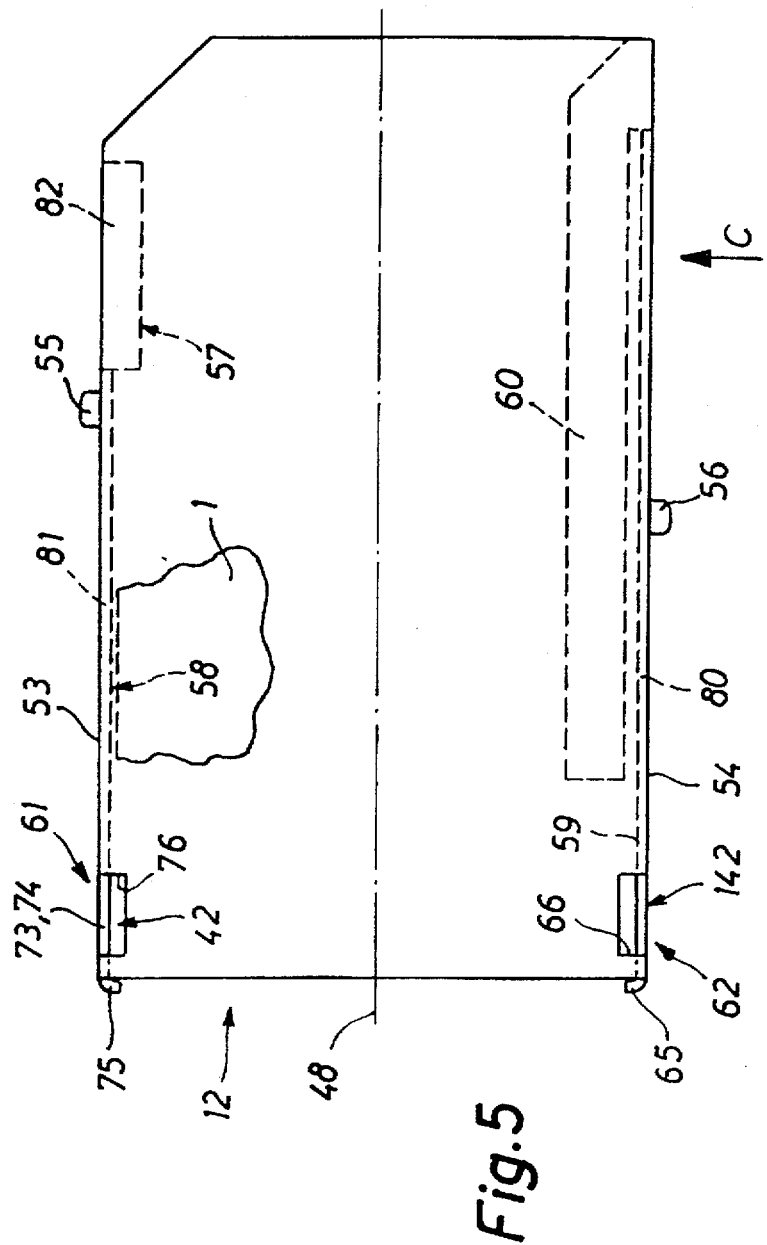

SHIELDED CONTACTING APPARATUS

The invention relates to a reader (chip card reader) or to a contacting apparatus for chip cards. Chip cards are also referred to as smart cards. The present invention relates, in particular, to a shielded chip card apparatus or chip card reader. The invention relates even more specifically to a shield chip card reader adapted to receive so called SIM cards. SIM stands for Subscriber Indentity Module.

BACKGROUND ART

Numerous types of chip card readers are known. More specifically, chip card readers are known which comprise a plastic cover into which a chip card, more specifically SIM card can be inserted. The cover together with the inserted SIM card can be pivoted into a position where reading contact elements of the chip card reader are conctacted by the contacts (contact pads or contacts) of the SIM card.

SUMMARY OF THE INVENTION

It is an object of the present invention to overcome the disadvantages of the prior art.

Another object of the invention is to provide a chip card reader which is designed such that it can be provided with electro-magnetic screening or shielding means in a cost effective manner, yet fulfilling the requirements and standards of electromagnetic shielding or screening.

In accordance with the invention, the above objects are achieved by providing a chip card reader with a cover which is made of metal. The metal cover is preferably of a closed design and provides for the required contacting of the shielding means (shield). A safe and effective connection to ground is provided.

Preferably, in accordance with the invention, the metal cover is designed such that it uses a pivot-push-design, i.e. the pivot-push cover is pivoted from an open position (where the chip or SIM card is inserted) into a closed position adjacent to the reading contact elements of the chip card reader. Preferably in said closed position the cover can be moved translationaly, i.e. it can be pushed into a locked or reading position. In the latter position the cover is held in a statinary position and the information in the chip card can be read and processed.

The pivot-push-cover is preferably made of metal by stamping and bending processes. The shielded connection (i.e. the connection between the shielding cover and ground) occurs preferably by directly contacting the cover. However, in accordance with another preferred embodiment, the pivot-push-cover is made of plastic material, i.e. a so-called metalized plastic material, where the cover is coated with a thin layer of metal. Alternatively, the cover could be made of conductive plastic material.

In accordance with the invention, the shielding for the chip card reader is provided by the closed metal cover. The contacting of the shield, the connection of the shield in the form of the cover with ground is provided for, preferably within the contour or periphery of the card. Possibly, however, said shield contacting can also be provided outside of the periphery of the chip card.

In accordance with the present invention, the cover connection or shield connection between the cover and ground is completed by additional contact elements (shield contact elements or switching contact elements) which are preferably of the same type as the contact elements for contacting the chip card contacts for reading purposes (reading contact elements). Preferably, said switching contacts or switching contact elements are adapted to contact the cover (shield). The switching contact elements, which could also be called shield contact elements, are provided in a contact support, which also contains said reading contact elements. In this manner, the shielding, i.e. the grounding of the cover, can be achieved without additional new components and also without additional assembly steps or additional manufacturing steps.

Thus, no special shielding contact elements, or grounding contact elements are necessary. Also no special shielding foils or metalized plastic covers are necessary, inasmuch as the contacting of the cover, i.e. its connection to ground which is provided, for instance, on a printed circuit board, can be carried out simply by the additional switch contact elements which are preferably similar design as the reading contact elements. In this context, it should be noted that it is readily possible to vary the number of contact locations, i.e. locations where a connection to ground is provided. For instance, from one to four contact locations can be provided.

In accordance with the present invention, the above defined problem is solved by the features of the independent claims. Preferred embodiments of the invention are disclosed in the dependent claims.

The invention does not require special contact locations between the cover and the apparatus providing ground, for instance the housing of a telephone apparatus. Moreover, the contacting principle of the invention can also be used as a "card present switch", i.e. a switch which indicates whether or not a card is located in the chip card reader.

The design of the chip card reader of the invention allows its use in the so-called pick and place method of assembly without requiring additional components, inasmuch as the cover provides sufficient space or surface area in its locked condition (i.e. the cover is in its locked position) so that the chip card reader can be lifted, for instance by means of suction means of an assembly device.

The shield or switch contact elements can be provided with a reduced contact force. This avoids a loss of contact force at the time the chip card reader is placed according to an SMD process on a circuit board. The SMD (SMD= surface mounted device) assembly process typically leads to some strain in the plastic material used for manufacturing the chip card reader, more specifically the contact support of the chip card reader.

In accordance with the invention, the pivot-push-design provided for the cover and contact support, can be manufacured without a sliding element. The sliding element is typically used for locking the cover in its reading postion.

Another advantage of the chip card reader of the invention resides in the fact that the cover cannot be moved translatorily or slid while in its open condition.

In accordance with a preferred design of the invention, the angle of opening between the cover and the contact support can be limited to different values.

In accordance with the invention, the chip card is held in the cover by a friction fit. Also due to the friction provided between the cover and the contact support, the cover will remain stationary in any position with the any angle of opening after being released from its locking position and after being pivoted into an open position.

It is not possible to lock the metal cover in its contacting position if the card is not properly inserted.

The general concept of the chip card reader of the invention is such that the mounting of components on the circuit board (on which the reader is used) does not influence the shielding effect provided by the shielding means (e.g. the cover) of the invention.

In accordance with the invention, the shielding effect is created when the metal cover is in its closed, preferably locked, position. In this position, the metal cover is directly or indirectly electrically connected with the shield or ground contact provided by the casing of the apparatus with which the chip card reader is used, or with the ground contact provided by the circuit board. The metal cover covers the entire contour or extension of the chip card and thus shields it.

In accordance with the present invention, the contact elements, more specifically, the so-called shield or switch contact elements are self cleaning.

As was already mentioned, the shielding effect can also be provided by means of lids or covers not only made of metal, but also made of a metal-plastic-compound or of a conductive plastic or a metalized plastic.

In accordance with the invention, the cover can be connected to or hinged at the contact support via connecting means in a releasable or a non-releasable manner. Preferably, the above mentioned pivot-push-design comprises connecting means including first bearing means (axis means or shaft means) and movable second or counter bearing means.

In the closed or reading position of the chip card reader, the fixation or location of the card is achieved with respect to the contact support in axial direction by means of ribs provided at the contact support. Preferably, one of the ribs comprises a polarizing bevel or guiding inclination. Preferably, the rib is connected via an arm with the card support.

The fixation or location or the guidance of the card in transveral direction is preferably provided at the cover.

Generally speaking the entire contacting apparatus including the shielding means comprises only three separate parts: the contact support made of plastic material, the cover and the switching contact elements.

BRIEF DESCRIPTION OF THE DRAWINGS

FIG. 5 is a plan view of a cover of the chip card reader of FIG. 1;

FIG. 6 is a side elevational view of FIG. 5 seen in the direction of arrow C; and FIG. 7 is a side elevational view of the cover of FIG. 6 seen from the direction of arrow D.

FIGS. 1 and 2 show a chip card reader of the invention, more specifically a SIM card reader 10, i.e. a reader or contacting apparatus for chip cards and more specifically for SIM cards. The SIM card reader 10 comprises a contact support 1 preferably in the form of a frame, and a cover 12 which is moveably mounted to said contact support 11 by connecting means. The cover 12 is preferable of the pivot-push design, i.e. the cover 12 can be pivoted into the plane of the contact support 11 into a closed position and then the cover 12 can be moved in a translatory manner, for purposes of locking the cover 12 into its locking or reading position (as shown in FIGS. 1 and 2), i.e. a position in which information can be read from the chip card.

Figure 2:
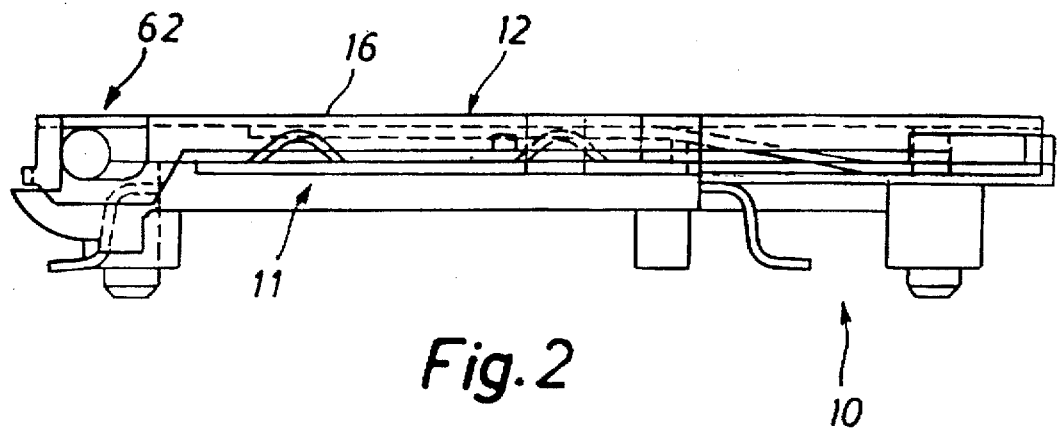
FIG. 2 is a side elevational view of the chip card reader of FIG. 1 seen from the direction of arrow A.

In accordance with the invention, the cover 12 is made of sheet metal, which is brought into the shape shown in the drawing preferably by stamping and bending operations.

Figure 1:
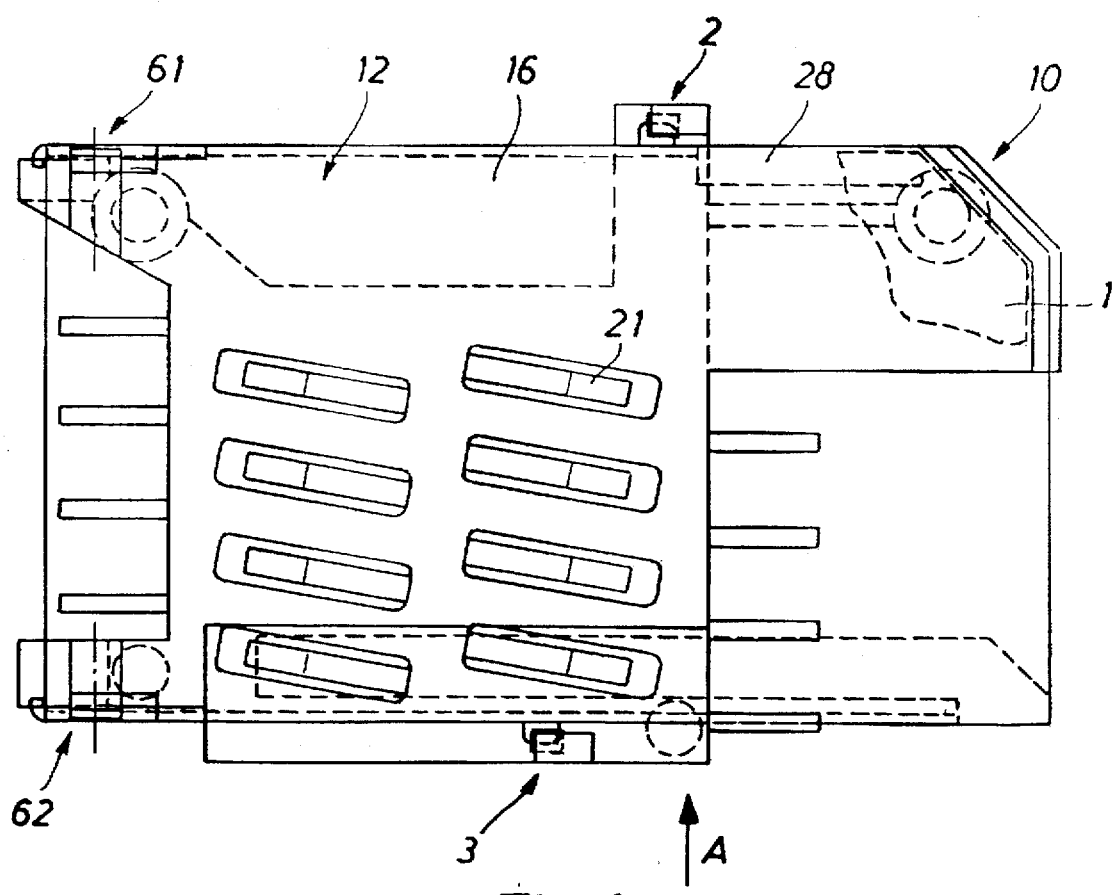
FIG. 1 is a plan view of a chip card reader of the invention.

In FIGS. 1 and 2 the cover 12 is shown in its locking or reading position with respect to the contact support 11 however, without showing the entire SIM card 1. Looking means, e.g. first and second looking means 2 and 3, respectively, are provided for this purpose. To provide some idea about the position of the SIM card 1, the upper right corner of the representation of FIG. 1 is broken up to show the SIM card 1 by dashed lines.

It is noted that the SIM card reader 10 is also preferably in its locked condition i.e. with the cover 12 being in its locked position as shown in FIGS. 1 and 2 (preferably without a SIM card being inserted), at the time the chip card reader 10 is shipped, or at the time the chip card reader is being mounted to a printed circuit board by means of assembly means.

The chip card reader 10 will be in its locked condition, i.e. the cover 12 will be placed in its locked position when the chip or SIM card 1 is inserted and has to be brought into contact with reading contact elements 21 of the SIM card reader 10. The reading contact elements 21 are adapted to contact the (card) contacts or contact pads of the chip card 1.

The cover 12 shown in its closed or reading position of FIGS. 1 and 2 can be moved translatorily or pushed leftwardly so as to become released. Then, the cover 12 can be pivoted away from the contact support 11. During this translatory and pivotal movement, the cover 12 is guided by linking or connecting means 61, 62, prerably first 61 and second 62 connecting means.

As can be seen, the cover 12 provides at its upper surface 16 sufficient area for the suction heads of an automatic assembling apparatus such that the SIM card reader 10 in its entirety can be lifted and placed, for instance, on a printed circuit board.

Figure 4:
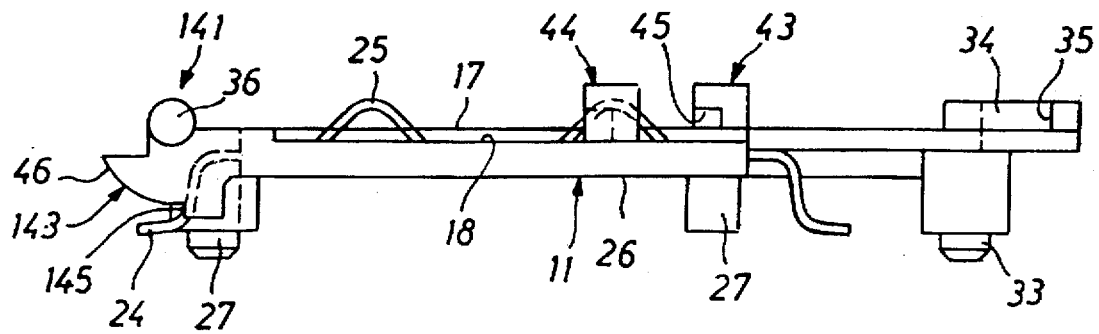
FIG. 4 is a side elevational view of the contact support of FIG. 3 seen in the direction of arrow B.
Figure 3:
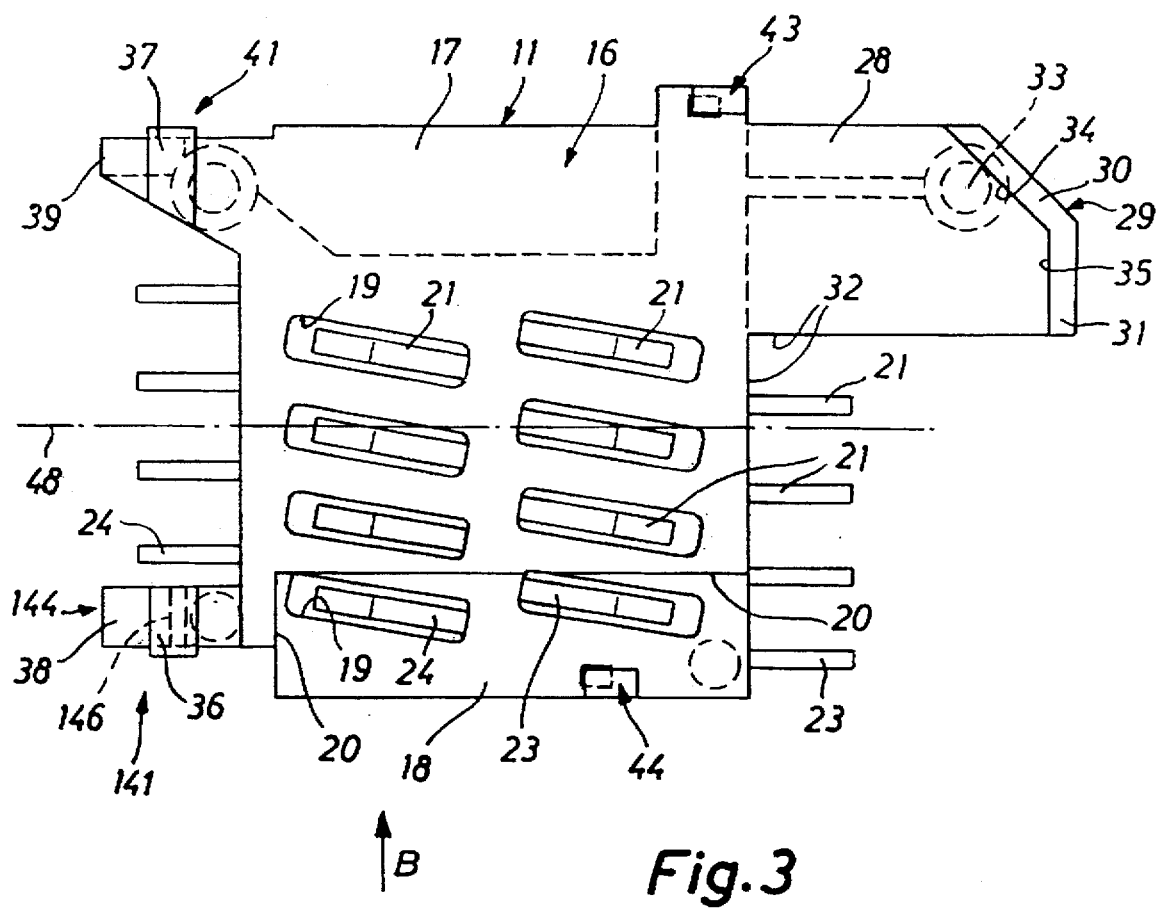
FIG. 3 is a plan view of the contact support of the chip card reader of FIG. 1.

FIGS. 3 and 4 disclose the contact support 11 in more detail. It can be seen that the upper surface 160 of the contact support 11 is of a stepped design. I.e., a larger surface 17 is on a higher level and a somewhat stepped down surface 18 is provided on a lower level. The surface 18 is bordered by turo edges 20 thus forming a recess.

Cutouts or recesses 19 are formed in the upper surface 160 to allow reading contacting elements 21 as well as additional contacting elements referred to as grounding, shielding, or switching contact elements 23, 24 to project upwardly beyond surfaces 17 and 18. The reading contact elements 21 as well as the grounding contact elements 23, 24 are preferably mounted in the plastic material of the contact support 11 by injection molding.

The contact elements i.e. both the reading contact elements 21 as well as the switch contact elements 23, 24 are preferably provided with cusps 25 (FIG. 4) and thus form contact locations for cooperation either with the contact pads of the chip card (as far as contact elements 21 are connected) or with the cover 12 (as far as contact elemens 24 are concerned).

The contact support 11 is provided with a lower surface 26 in which mounting pins 27 are provided. The mountaing pins 27 are adapted to be inserted in to a printed circuit board (not shown). The contact support 11 further forms a projection or tongue 28. The contact support 11, as a whole, is preferably formed by injection molding of a plastic material.

The projection 28 is also provided with rib means 29 which comprises in more detail an inclined rib (polorizing rib) 30 as well as a transverse rib 31. Thus, the projection 28 forms for all practical purposes, a recess or a free space 32 for the SMD termination ends of the contact elements 21, 24. The termination ends of some of the contact elements 21, 23 extend into said recess. At the lower surface of projection 28 a mounting pin 33 is formed similarly to mounting pin 27. The polarizing rib 30 forms a polarizing bevel (inclined surface) 34 for the abutment of SIM card 1. The transversal rib 31 forms an abutment surface 35 for the SIM card 1.

Referring again to FIGS. 1 and 2 as well as FIGS. 3 and 4, each of the above mentioned connecting means 61, 62 comprises a) first or stationary bearing means 41, 141 which are formed on or by contact support 11, and b) second or movable bearing means 42, 142 (FIGS. 5–7). The first bearing means 41, 141 each preferably comprises a pivot pin 36, 37. Said pivot pins 36,37 are preferably formed at extensions 38, 39 (see FIG. 3) of the contact support 11 and they are preferably formed together with the contact support of a plastic mateial.

The first and second connecting means provide for said pivotal and translatory relative movement between said support 11 and said cover 12.

Further, said first bearing means 41, 141 comprises pivot guide means 143, 144 as well as pivot abutments 145. 146.

The locking means 2,3 (already mentioned) each comprises stationary detent or holding means 43,44 at said contact support 11. The holding means 43, 44 are adapted to cooperate with counter detent means in the form of laterally extending projections 55,56 of the cover 12.

FIG. 3 further discloses that the contact elements 21, 24 are preferably arranged inclined on a small angle with respect to a longitudinal axis 48 of the contact support 11.

FIGS. 5–7 disclose the cover 12 in its final shape i.e. after stamping and bending a piece of sheet metal. The cover 12 comprises an upper wall 52 as well as a first side wall 53 and a second side wall 54. FIG. 5 shows at the left end of the cover part of 11 the above mentioned connecting or linking means 61, 62 i.e. the second bearing means 42, 142 and spaced therefrom said counter detent means 55, 56. The bent sheet metal portions of cover 12 further form first guide or receiving means 57, second guide means 58 and third guide and receiving means 59. Said guide means 57 and 60 are channel shaped as is shown in FIG. 7 and they are adapted to receive the SIM card.

A (pressure) spring or a contact tongue 60 is provided at the cover 12. It is preferably formed integrally with the cover 11 out of the material used for the cover. The spring 60 is biased upwardly against the bottom surface of the upper wall 52 as is shown in FIG. 6, i.e., preferably, the spring 60 is in resilient abutment with the bottom surface of the upper wall 52. When the SIM card or chip card is moved or pushed from the right hand side (FIG. 5) into the channels formed by the said guide means 57–59, then the pressure spring 60 is pressed downwardly and contacts after the sliding and closing movement of the cover 12 the switching contacts 23 and 24, by contacting them. The width of the spring 60 is such that it fits into recess formed by edges 20 (see FIGS. 1 and 3).

The second bearing means 42, 142 comprise each a ring or sickle portion 63 and 73, respectively. Said sickle portions 63, 73, respectively form a recess 64 and 74, respectively. Further, tabs 65 and 75, yet to be described, are preferably provided integrally with the cover 11.

Said first guide means 57 forms a receiving slot 82. The second guide means 58 forms a lateral guide and the third guide means 95 also form a lateral guide.

Preferably all the contact elements i.e. both the reading contact elements 21 as well as the switching or ground contact elements 23 are not biased. Thus, they have, compared with biased contact elements, a larger spring action path.

The tonge shaped pressure spring 60 extends in the direction of the longitudal axis 48 across a length which is larger than half the length of the cover 11. As mentioned, the spring 60 is resiliently bent upwardly so as to generate the required spring force at the time the cover 11 is assembled to the contact support 11. This design makes sure that the contact elements 21, 23, 24 are not under a load when the contact support 11 is mounted to a circuit board by soldering.

The first or stationary pivot-bearing means 41, 141 are provided with the already mentioned pivot guide means 143, 144 in the form of a rounded bearing means. That rounded means is adapted to cooperate with the guide tabs 65, 75 provided at the cover 12 when that cover 12 is pivoted.

The maximum opening position for the pivotable cover is defined by pivot abutments 145 146. The pivot abutments 145 146 can also be located at a position different from the position shown in FIG. 4. For instance the pivot abutment means 145 146 could be moved leftwardly in the FIG. 4 along said rounded bearing means 143, 144.

The FIGS. 1 and 2 show the SIM card reader and the cover 12 in their locked or reading position i.e. the locking means 2 and 3, respectivly, are in engagement with each other. Or, more specifically, the projections 55 and 56 (i.e. the counter dentent means) are inserted into the recesses 45 formed by the mounting means 43 and 44 such that the cover 12 is held in the locking position due to a clamping force thus created.

If it is desired to insert a SIM card 1 into the SIM card reader 10, after the SIM card reader has been installed in an aparatus (for instance a telephone apparatus) within which the SIM card is going to be used, then it is necessary to move or push the cover 12 leftwardly (as seen in FIGS. 1 and 2) until cover 12 (see FIG. 2) can be lifted and pivoted leftwardly and upwardly. Thereupon, the SIM card 1 is inserted into the cover 12 until the SIM card abuts against pins 36 and 37. The insertion occurs against a force excerted by the tonge or the pressure spring 60. Thereupon the cover 12 is moved clockwise (FIG. 2) until the SIM card comes into abutment with said rib means 29 or more specifically with the polarizing or alignment bevel 34 of the abutment surface 35. In case the SIM card 1 is not properly inserted, then it is impossible to close the cover 12.

Then, after the cover 12 has been pivoted downwardly into a closed position against the contact support 11, it is pressed against the contact support and also against the contact elements and is moved or slid rightwardly while the SIM card remains in abutment with the surfaces 34 and 35. Then, the projections 55, and 56 come again into engagement with the mounting means 43, 44, and the cover 1 is in its locked position, i.e. the chip card reader is in its locked or reading condition.

It should be clear that the above description of the invention is illustrative only and should not be considered in a limiting sense. Many modifications are possible within the scope and spirit of the present invention which is only limited by scope of the attached claims.

We claim:

1. A contacting apparatus for a chip card, in particular for a SIM card (1), said contacting apparatus comprising
a contact element support (11),
a metal cover (12),
reading contact elements (21) supported in said contact element support (11),
switching or grounding contact elements (23, 24) supported in said contact element support (11), and
means (60) for connecting the metal cover (12) via said switching contact elements to ground when said chip card is inserted into said apparatus.

2. The apparatus of claim 1 wherein said contacting and connecting means comprises a spring (60) mounted to said cover (12).

3. The apparatus of claim 2 wherein said spring is part of a piece of sheet metal which is stamped and bent to form said cover.

4. The apparatus of claim 2 wherein the spring (60) is a leaf spring which is located along one longitudinal side wall of the cover.

5. The apparatus of claim 3 wherein the spring is a leaf spring (60) that is bent towards the bottom surface of the upper portion of the cover.

6. The apparatus of claim 1 wherein the reading and the switch contact elements are stationarily located in said contact element support (11) which is made of plastic material.

7. The apparatus of claim 2 wherein the contact element support comprises a recess in the area of said spring.

8. The apparatus of claim 1 wherein said cover (12) is designed to carry out a pivoting movement between an open position and a closed position and a translational movement between said closed position and a locked position, both with respect to said contact element support.

9. The apparatus of claim 1 wherein the cover is a stamped and bent part made of sheet metal, and said contacting and connecting means is a leaf spring formed by a side wall of said cover being bent around by 180° to extend parallel to the top surface of the cover.

10. The apparatus of claim 9 wherein a shielding effect is generated by the closed metal cover (12) and wherein the connection for shielding purposes between said cover and ground by means of said switch contact elements occurs preferably within the outline of the card, said spring being pressed against at least one of said switching contacts.

11. The apparatus of claim 8 wherein the cover (12) and the contact element support are provided at one end with linkage or connecting means (61, 62) adapted to provide said pivotal and translational movements.

12. The apparatus of claim 11 wherein said connecting means comprises first stationary and second moveable pivot bearing means (41, 141; 42, 142).

13. The apparatus of claim 12 wherein abutment means (65, 75) are provided such that the cover (12) cannot make translational movements if it is in an open condition.

14. The apparatus of claim 11 wherein the connecting means (61, 62) limit the opening angle between the cover (12) and the contact support (11).

15. The apparatus of claim 1 wherein the card is held in the cover (12) due to frictional engagement.

16. The apparatus of claim 9 wherein the connecting means (61, 62) comprise a tab (65, 75) and rounded means (143, 144) provided at the cover and contact support, respectively, such that the cover after being released from its closed or locked position remains stationary in any position so that the card can be inserted or removed due to the coorperation of a tab (65, 75) and rounded means (143, 144) provided at the cover and contact support, respectively.

17. The apparatus of claim 1 wherein means are provided which prevent the locking of the cover (12) in case a card is improperly inserted.

18. The apparatus of claim 1 wherein the reading and switch contact elements are not biased and wherein the switching contact elements are of a self cleaning design.

19. The apparatus of claim 1 wherein the cover (12) is releasably connected with the contact support (11), and wherein the cover (12) comprises a rigid shaft or an axis cooperating with a moveable counter bearing.

20. The apparatus of claim 1 wherein the fixation of the card in the closed and in the reading position of the cover, i.e. the direction of the longitudinal axis (48), is provided by rib means (29) and pins (36, 37), said rib means comprising a polarization bevel (34) which is connected with the contact support (11) by means of a projection (28), and wherein the cover (12) is provided with means for fixing or locating the card in a transversal direction i.e. crosswise with respect to the longitudinal axis (48).

21. The apparatus of claim 12 wherein the stationary pivot bearing means (14, 141) comprises pivot guide means (143, 144) which cooporate with guide means of the cover (12).

22. The apparatus of claim 12 wherein the stationary pivot bearing means (41, 141) form pivot abutment means (145, 146) which can be differently positioned, so as to limit the extent of the pivotal movement of the cover differently.

23. The apparatus of claim 12 wherein the movable pivot bearing means (42, 142) are formed at the cover (12).

24. The apparatus of the preceeding claim 23 wherein the pivot bearing means (42, 142) on the cover comprise recesses (64, 74) as well as tabs (65, 75) adapted for cooporation with that pivot guide means (143, 144) of the contact support (11).

25. The apparatus of claim 1 wherein along the lateral longitudal edges guide means are provided at the cover.

26. A shielded contacting apparatus for a chip card, said apparatus comprising a contact element support (11),
a cover (12) made of conductive plastic material or a metalized plastic material, and
reading contact elements (21) and switching contact elements (23, 24) arranged in said contact element support (11), and
switching means preferably formed by said cover (12) to provide an electric connection between the cover (12) and ground via switching contact elements (23, 24) when said chip card is inserted into said apparatus.

* * * * *

UNITED STATES PATENT AND TRADEMARK OFFICE
CERTIFICATE OF CORRECTION

PATENT NO. : 5,718,609

DATED : Feb. 17, 1998

INVENTOR(S) : Braun et al.

Page 1 of 3

It is certified that error appears in the above-identified patent and that said Letters Patent is hereby corrected as shown below:

Column 1:

Line 18, "conctacted" should read --contacted--.

Line 44, "statinary" should read --stationary--.

Column 2:

Line 16, after "similar" insert --in--.

Line 61, delete "the".

Column 3, Line 13, insert a space after the comma in "invention,the"

Column 3, Line 45, "FIG. 2 is a . . ." should begin a new paragraph.

Column 3, After line 57, insert the following centered heading:

--DETAILED DESCRIPTION OF THE PREFERRED EMBODIMENT--.

UNITED STATES PATENT AND TRADEMARK OFFICE
CERTIFICATE OF CORRECTION

PATENT NO. : 5,718,609
DATED : Feb. 17, 1998
INVENTOR(S) : Braun et al.

It is certified that error appears in the above-identified patent and that said Letters Patent is hereby corrected as shown below:

Column 4:

Line 9, "Looking" should read --Locking--.

Line 10, "looking" should read --locking--.

Line 44, "I.e." should read --i.e--.

Line 61, "connected" should read --concerned--.

Line 62, "elemens" should read --elements--.

Line 65, "mountaing" should read --mounting--.

Line 66, "in to" should read --into--.

Column 5:

Line 19, insert a space after the comma in "36,37"

Line 28, insert a space after the comma in "2,3"

Line 29, insert a space after the comma in "43,44"

Line 32, insert a space after the comma in "55,56"

UNITED STATES PATENT AND TRADEMARK OFFICE
CERTIFICATE OF CORRECTION

PATENT NO. : 5,718,609
DATED : Feb. 17, 1998
INVENTOR(S) : Braun et al.

It is certified that error appears in the above-identified patent and that said Letters Patent is hereby corrected as shown below:

<u>Column 6</u>:

Line 9, "tonge" should read --tongue--.

Line 25, "145 146" should read --145, 146--.

Line 26, "145 146" should read --145, 146--.

Line 28, "145 146" should read --145, 146--.

Line 32, "respectivly," should read --respectively--.

Line 40, "aparatus" should read --apparatus--.

Line 47, "tonge" should read --tongue--.

Signed and Sealed this

Twenty-first Day of July, 1998

Attest:

BRUCE LEHMAN

*Attesting Officer*          *Commissioner of Patents and Trademarks*